United States Patent [19]
Meyerhoefer et al.

[11] Patent Number: 5,844,764
[45] Date of Patent: Dec. 1, 1998

[54] RESIDENTIAL PROTECTION SERVICE CENTER

[75] Inventors: Carl H. Meyerhoefer, Dix Hills; Nisar A. Chaudhry, West Babylon; Thomas J. Smith, Bayshore, all of N.Y.

[73] Assignee: TII Industries, Inc., Copiague, N.Y.

[21] Appl. No.: 868,351

[22] Filed: Jun. 3, 1997

[51] Int. Cl.⁶ ................................................. H02H 3/22
[52] U.S. Cl. ............................................ 361/111; 361/119
[58] Field of Search ........................... 361/56, 111, 117, 361/118, 119; 379/156, 399, 324–326, 330–332

[56] References Cited

U.S. PATENT DOCUMENTS

| | | | |
|---|---|---|---|
| 4,438,477 | 3/1984 | Cawley | 361/119 |
| 4,616,155 | 10/1986 | Guichard | 313/573 |
| 4,979,209 | 12/1990 | Collins et al. | 379/399 |
| 5,394,466 | 2/1995 | Schneider et al. | 379/399 |
| 5,553,136 | 9/1996 | Meyerhoefer et al. | 379/399 |
| 5,566,056 | 10/1996 | Chaudhry | 361/117 |

*Primary Examiner*—Ronald W. Leja
*Attorney, Agent, or Firm*—Morgan & Finnegan

[57] ABSTRACT

Residential protection service center apparatus comprising an AC power meter, AC power line surge suppression, telephone line overvoltage protection and coaxial transmission line overvoltage protection, all tied to a common ground.

33 Claims, 7 Drawing Sheets

RESIDENTIAL PROTECTION SERVICE CENTER

BACKGROUND OF THE INVENTION

1. Field of the Invention

The present invention relates to apparatus for protecting AC power lines, telephone lines and coaxial transmission lines and, more particularly, to apparatus which provides protection for those lines in a single enclosure which contains an AC power meter and a common ground.

2. Discussion of the Related Art

In the past few years more and more homes have begun using sensitive electronic equipment as telecommuting and conducting business from one's home has become more commonplace. In addition to home entertainment centers with expensive audio/visual equipment, many homes now have personal computers, modems, printers, copiers, facsimile machines, telephone answering systems and home security systems. This sensitive electronic equipment is connected to the outside world by means of telephone lines (both conventional and high speed data lines), coaxial transmission lines (both cable TV and satellite dish antenna) and AC power lines.

Telephone lines are traditionally protected by surge arrestors located in network interface devices mounted on the sides of homes. See devices 73 in FIG. 3 of U.S. Pat. No. 4,979,209 issued to Collins et al on Dec. 19, 1990. Grounding for these overvoltage protection devices is provided by means of an earth ground brought into the enclosure at the time of installation and attached to ground bus 71 at terminal 71A.

Coaxial transmission lines carrying cable television signals may also be brought into a home through network interface devices. See U.S. Pat. No. 3,394,466 issued to Schneider et al on Feb. 28, 1995. As shown in FIG. 1 of that patent, the coaxial cable is grounded by connecting a ground strap 228 from module 220 to ground bus 71 which is then connected to earth ground. See column 4, lines 50–54. Coaxial surge arrestors for protecting coaxial transmission lines from overvoltage conditions are also known. See U.S. Pat. No. 4,616,155 issued to Guichard on Oct. 7, 1986 and U.S. Pat. No. 5,566,056 issued to Chaudhry on Oct. 15, 1996.

It is also known to protect sensitive electronic equipment by providing overvoltage protection for AC power lines. Secondary surge arrestors which plug into wall outlets and accommodate a series of male electrical plugs are in common use. The assumption made in using such devices is that they are properly grounded. A device which plugs into a wall outlet and provides protection for telephone lines is also known. See U.S. Pat. No. 4,438,477 issued to Cawley on Mar. 20, 1984.

SUMMARY OF THE INVENTION

The present invention eliminates the practice of providing piecemeal protection for electronic devices by providing a residential protection service center having surge suppressors for AC power lines, overvoltage protection for telephone lines and overvoltage protection for coaxial transmission lines within a single enclosure. Moreover, the protection center includes an AC power meter and ties all of the protective devices to a common ground which is also the ground for the AC power. The result is a protection system that is more efficient in its use of protective devices and more effective in that the protective devices are all tied to the common ground of the AC power system.

The subject matter which we regard as our invention is more particularly pointed out in the claims at the end of the specification. The invention, including its method of operation and its numerous advantages, may best be understood by reference to the following description taken in connection with the accompanying drawings wherein like reference numerals refer to like components.

DESCRIPTION OF THE PREFERRED EMBODIMENTS

Figure 1:
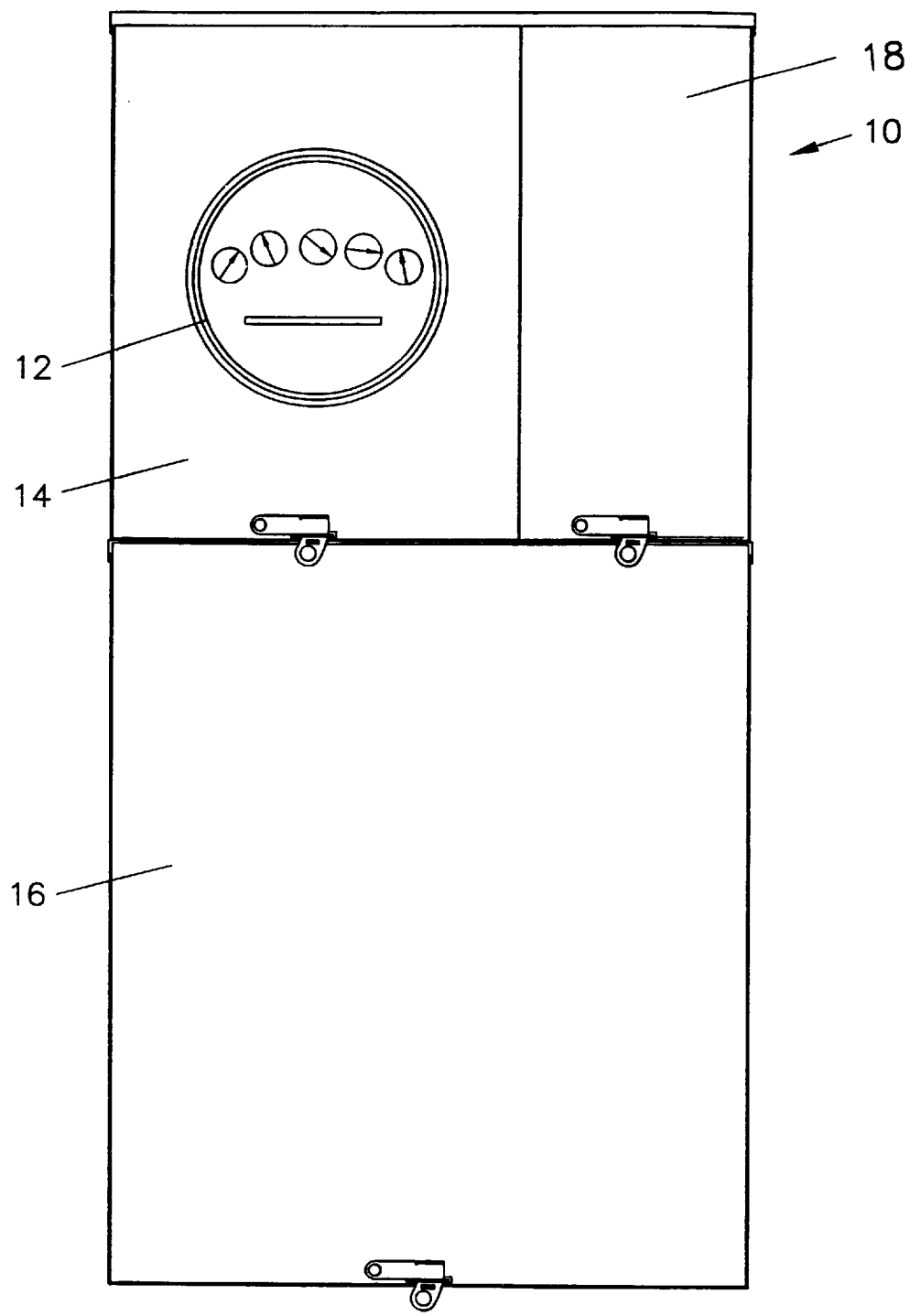
FIG. 1 is a plan view of a residential protection service center according to the present invention with the access covers in the closed position.

FIG. 1 shows a residential protection service center in accordance with the present invention. It comprises an enclosure 10 having an AC power meter 12. The enclosure has a customer access cover 18, a utility company access cover 14 and a cover 16 that is shared by the customer and the utility.

Figure 2:
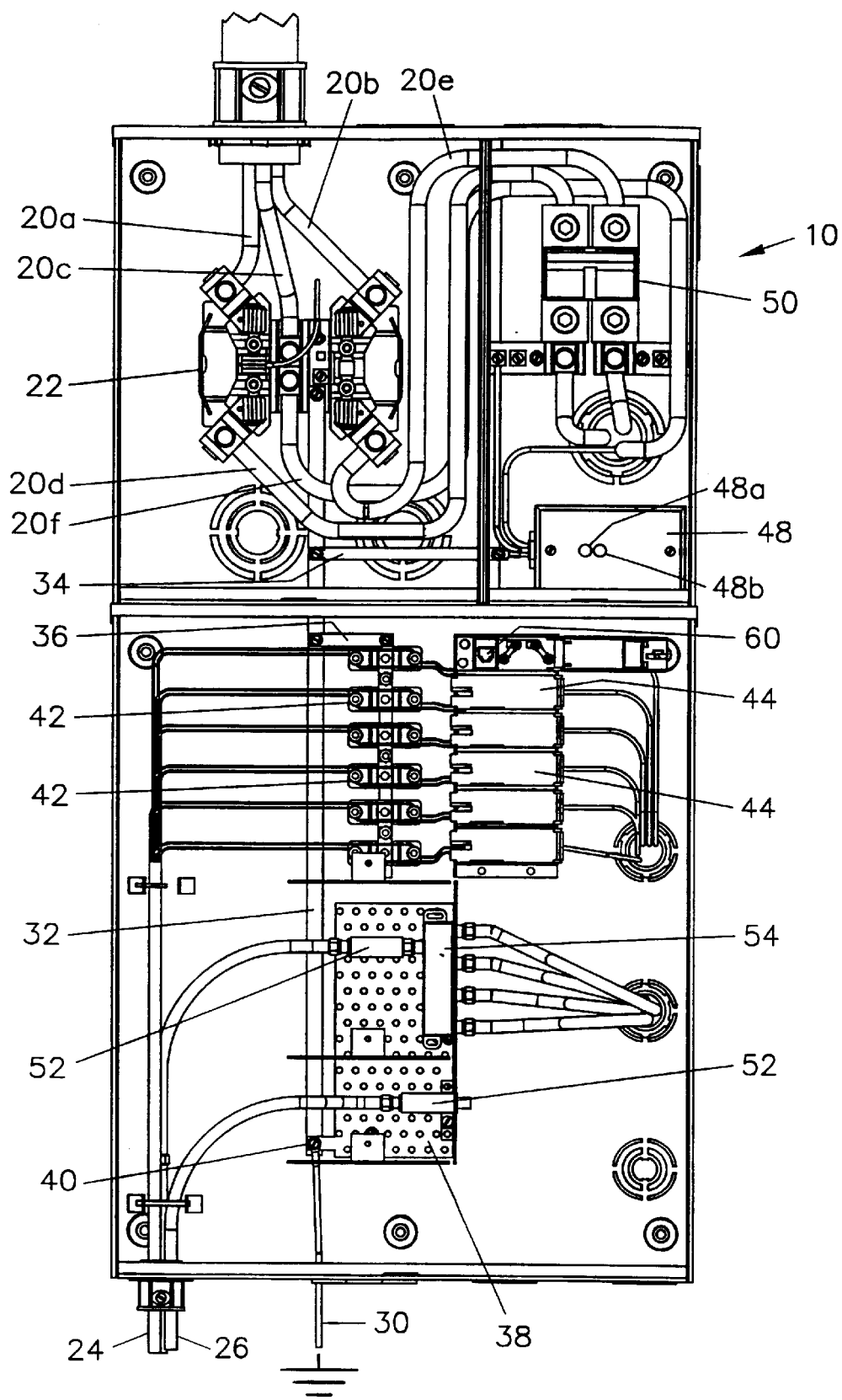
FIG. 2 is a plan view of a residential protection service center according to the present invention with the access covers removed.

FIG. 2 shows the residential protection service center of the present invention with the utility company and customer access covers removed. The enclosure 10 receives a cable containing AC power lines 20a and 20b and neutral 20c which are connected to the input side of AC power meter pan base 22. Also connected to the AC power meter pan base 22 is a ground conductor 32. Neutral wires 20c and 20f are connected to ground conductor 32. At the time of installation an earth ground 30 is brought into the enclosure and connected to ground conductor 32 by a suitable electrical connector 40. Wires 20d and 20e connect the output side of AC power meter pan base 22 to the input side of customer ON/OFF switch 50 which allows the customer to shut off power to the residence. The output side of switch 50 is connected to the customer's electrical distribution network through a circuit breaker panel or fuse box (not shown).

Enclosure 10 may also contain a surge suppressor 48 for suppressing voltage surges on the AC power lines. Surge suppressor 48 is connected to the residential side of meter 12 and to ground conductor 32 by a ground conductor 34. Surge suppressor 48 may, for example, be a Model EMC 240A or a Model EMC 240B surge suppressor made by TII Industries, Inc., Copiague, N.Y. The surge suppressor 48 may contain LED indicators 48a, 48b which provide an indication when protection has failed for each of the AC lines.

In addition to AC power lines, enclosure 10 also receives cable 24 containing telephone company ("telco") lines carrying voice and/or data signals. The telco lines are connected to overvoltage protection devices 42 (which may also include overcurrent protection) which protect the telco lines. A suitable overvoltage protection device is the Model No. MSP 350 made by TII Industries, Inc., Copiague, N.Y. A suitable overvoltage/overcurrent protection device is the Model No. 356M3 also made by TII Industries. The telco lines are also connected to customer bridge modules 44 which interconnect the telco and customer lines. The customer bridge modules 44 preferably contain an RJ-11 type jack 60 which provides a point of demarcation between the telco and customer lines as explained more fully later. The overvoltage protection devices 42 are connected to a ground conductor 36 which is connected to ground conductor 32.

Enclosure 10 also receives a coaxial transmission line 26 which may carry video signals from a cable television company or a satellite dish antenna. The coaxial transmission line is connected to a coaxial connector 52 which preferably includes a coaxial surge arrestor which may, for example, be a Model E210 made by TII Industries, Inc., Copiague, N.Y. The coaxial surge arrestor is described in greater detail later. The coaxial connector is mounted on a ground conductor 38 which may take the form of a ground plate as shown in FIG. 2. Coax ground conductor 38 is connected to ground conductor 32 at the point 40 where earth ground 30 is connected to ground conductor 32. Also mounted on ground conductor 38 is a coax splitter 54 which splits the incoming coaxial transmission line into four outgoing coaxial transmission lines. Coax splitter 54 may include an amplifier to compensate for signal attenuation caused by the signal splitting and/or to match the impedances of the incoming and outgoing coaxial transmission lines.

Figure 3:
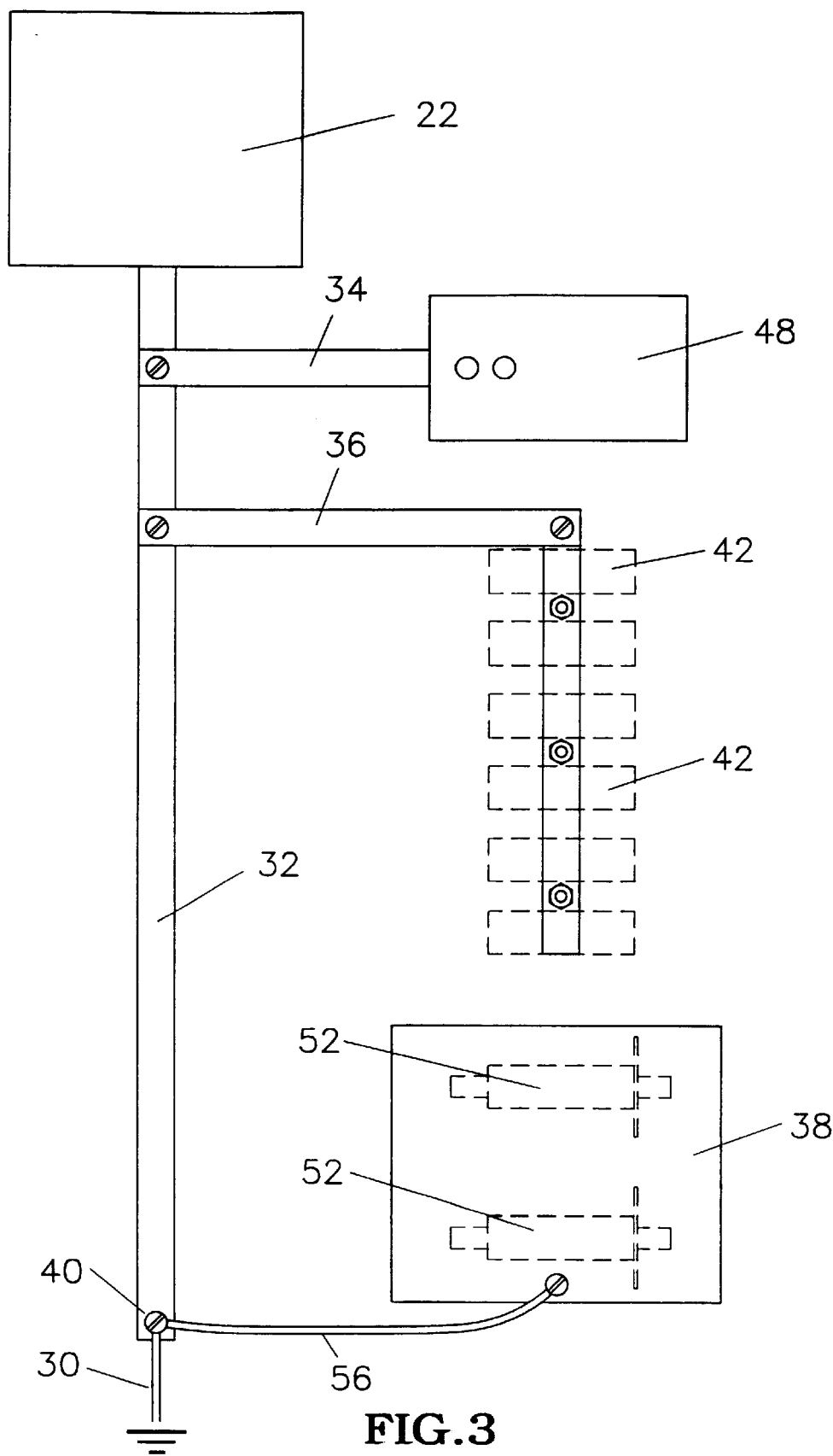
FIG. 3 is a schematic block diagram showing a first grounding arrangement for the residential protection service center of the present invention.
Figure 4:
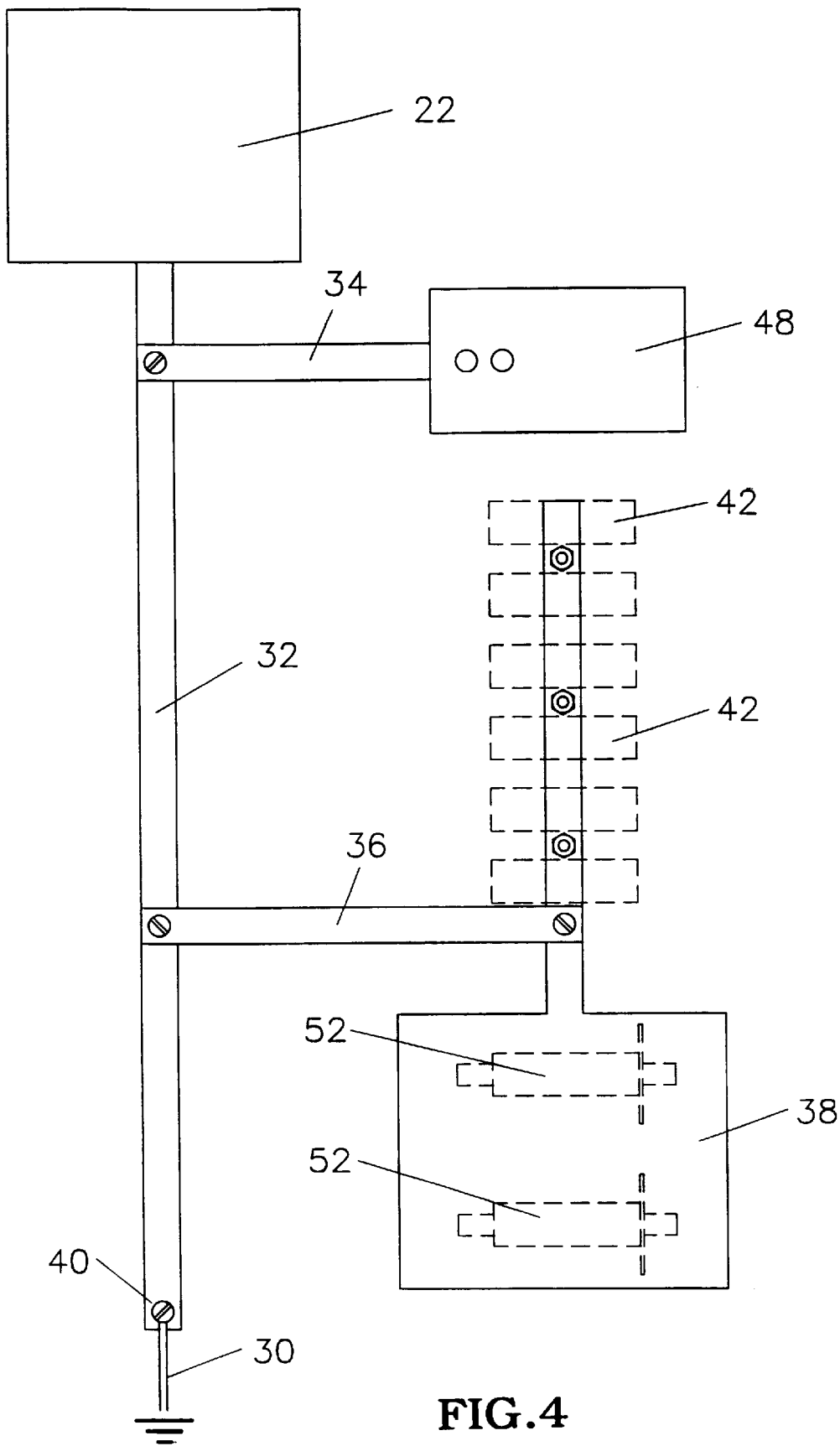
FIG. 4 is a schematic block diagram showing a second grounding arrangement for the residential protection service center of the present invention.
Figure 5:
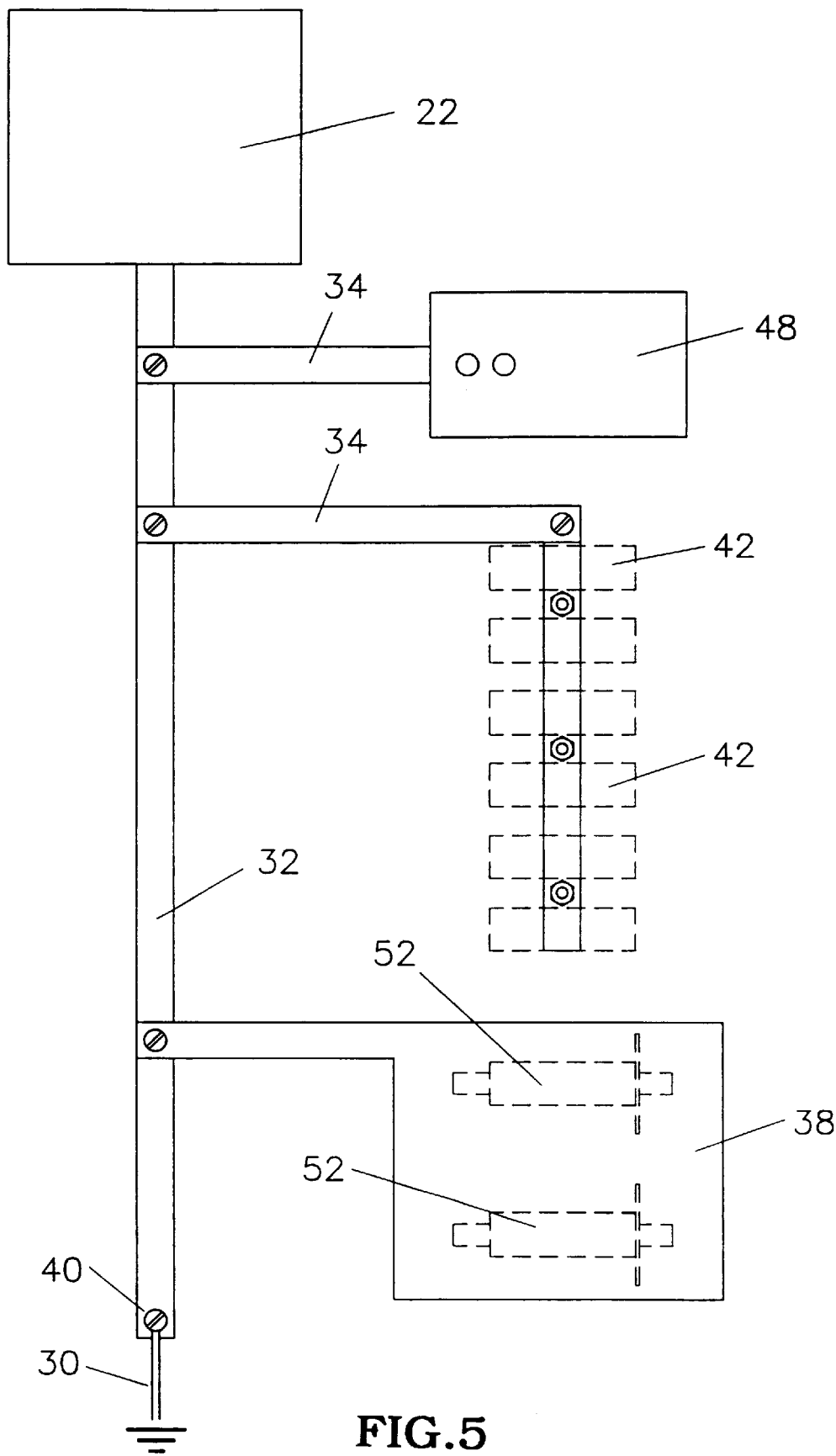
FIG. 5 is a schematic block diagram showing a third grounding arrangement for the residential protection service center of the present invention.

FIGS. 3 through 5 show various grounding arrangements for the residential protection service center of the present invention. Because the focus of FIGS. 3 through 5 is on grounding, various components located in enclosure 10 are indicated in FIGS. 3 through 5 by solid or dashed lines. Thus, AC power meter pan base 22, AC surge suppressor 48 and coax ground conductor 38 are indicated by solid lines, whereas the telephone line surge arrestors 42 and coaxial connectors 52 are indicated by dashed lines.

In FIG. 3 ground conductor 32 is the main ground bus and is connected between AC power meter pan base 22 and earth ground 30 which is brought into enclosure 10 at the time of installation. Ground conductor 34 is connected between ground bus 32 and AC surge suppressor 48, ground conductor 36 is connected between ground conductor 32 and the telephone line surge arrestors 42, while ground conductor 56, shown as a jumper wire, connects the coax ground plate 38 to the point 40 where earth ground 30 is connected to the ground bus 32. Thus, the coax ground plate is connected directly to earth ground and is not connected to earth ground by means of ground conductor 36, which is used to ground telephone line surge arrestors 42.

In FIG. 4 ground conductor 32 is the main ground bus and is connected between AC power meter pan base 22 and earth ground 30 which is brought into enclosure 10 at the time of installation. Ground conductor 34 is connected between ground bus 32 and AC surge suppressor 48, while ground conductor 36 is connected between ground bus 32 and both the telephone line surge arrestors 42 and the coax ground plate 38. In FIG. 4 the coax ground plate is connected to earth ground by means of the same ground bus 36 which is used to ground telephone line surge arrestors 42.

In FIG. 5 ground conductor 32 is the main ground bus and is connected between AC power meter pan base 22 and earth ground 30 which is brought into enclosure 10 at the time of installation. Ground conductor 34 is connected between ground bus 32 and AC surge suppressor 48, ground conductor 36 is connected between ground bus 32 and the telephone line surge arrestors 42, while the coax ground plate 38 is connected to ground bus 32 at a point that is intermediate the connection 40 between earth ground 30 and ground bus 32 and the connection between ground bus 32 and AC power meter pan base 22. In both FIG. 5 and FIG. 3 the coax ground plate 38 is not grounded by means of ground bus 36 which is used to ground the telephone line surge arrestors 42. Only in the grounding arrangement shown in FIG. 4 is the coax ground plate 38 grounded using the ground bus 36.

Figure 6:
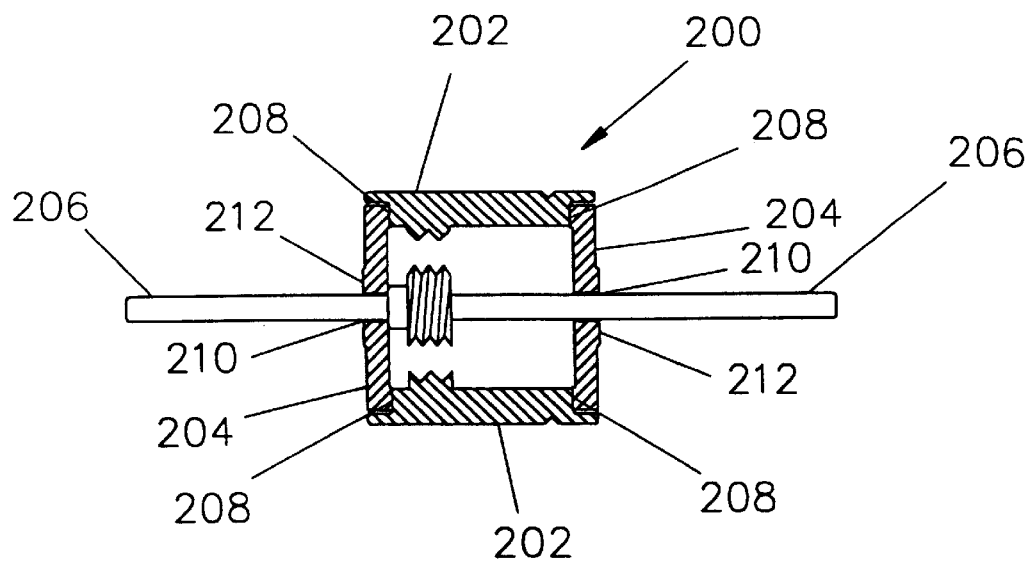
FIG. 6 is a cross-sectional view of a coaxial surge arrestor for use with the residential protection service center of the present invention.

FIG. 6 is a reproduction of FIG. 14 from U.S. Pat. No. 5,566,056 issued to Chaudhry on Oct. 15, 1996. FIG. 6 illustrates a coaxial surge arrestor which may be used in the coaxial cable connector 52 of FIG. 2. As explained at column 6, line 54 through column 7, line 51 of U.S. Patent No. 5,566,056, a portion of the interior surface 214 of conductive housing 202 and a portion of the exterior surface 216 of center conductor 206 are roughened, for example by threads or other forms of serration, to concentrate the electric field and increase the reliability of the gas discharge tube operation. In addition, as with conventional gas discharge tubes, the surfaces 214 and 216 are preferably coated with a low work function material to reduce the breakdown voltage and enhance the firing characteristics of the gas discharge tube. The gas discharge occurs in the region "G" between surfaces 214 and 216. Region "G" is the active discharge region.

As also shown in FIG. 6, the distance between the inner surface of the conductive housing 202 and the outer surface of the center conductor 206 varies along the length of the center conductor. Put another way, the ratio of the inside diameter D of housing 202 to the outside diameter d of center conductor 206 varies along the length of the center conductor. The ratio D/d may vary by a factor of 2 or 3 or more along the length of center conductor 206. This variation in the ratio D/d is used to adjust the impedance of the gas discharge tube and for matching the impedance of the surge arrestor in which the gas discharge tube is located to that of the coaxial transmission line to which the surge arrestor is attached.

The impedance of a coaxial transmission line is proportional to the logarithm of (D/K)/d, where "D" is the inside diameter of the outer conductor, "d" is the outside diameter of the inner conductor and "K" is the dielectric constant of the medium between the inner and outer conductors. In the case of the gas discharge tube shown in FIG. 6, the medium is an inert gas which has a dielectric constant of approximately one. Therefore, the impedance of the gas discharge tube varies between the insulating ends as the logarithm of the ratio D/d. The insulating ends 204 are preferably ceramic and ceramic has a dielectric constant of about eight. By varying the ratio D/d along the length of center conductor 206 one can compensate for changes in impedance caused by, inter alia, the dielectric constants of the insulating ends 204. The portion of gas discharge tube 200 that is used for impedance matching is designated by the letter "I", to distinguish it from the active discharge region "G".

In addition to adjusting the ratio D/d within the gas discharge tube, it is also possible to adjust the length of the active gas discharge region "G" relative to the length of the impedance matching region "I" to match the impedance of the gas discharge tube to that of the coaxial transmission line. Thus, for a 50 ohm coaxial transmission line the ratio of the region "G" to the region "I" may be on the order of one to one whereas, for a 75 ohm coaxial transmission line, the ration of the region "G" to the region "I" may be on the order of one to two.

Figure 7:
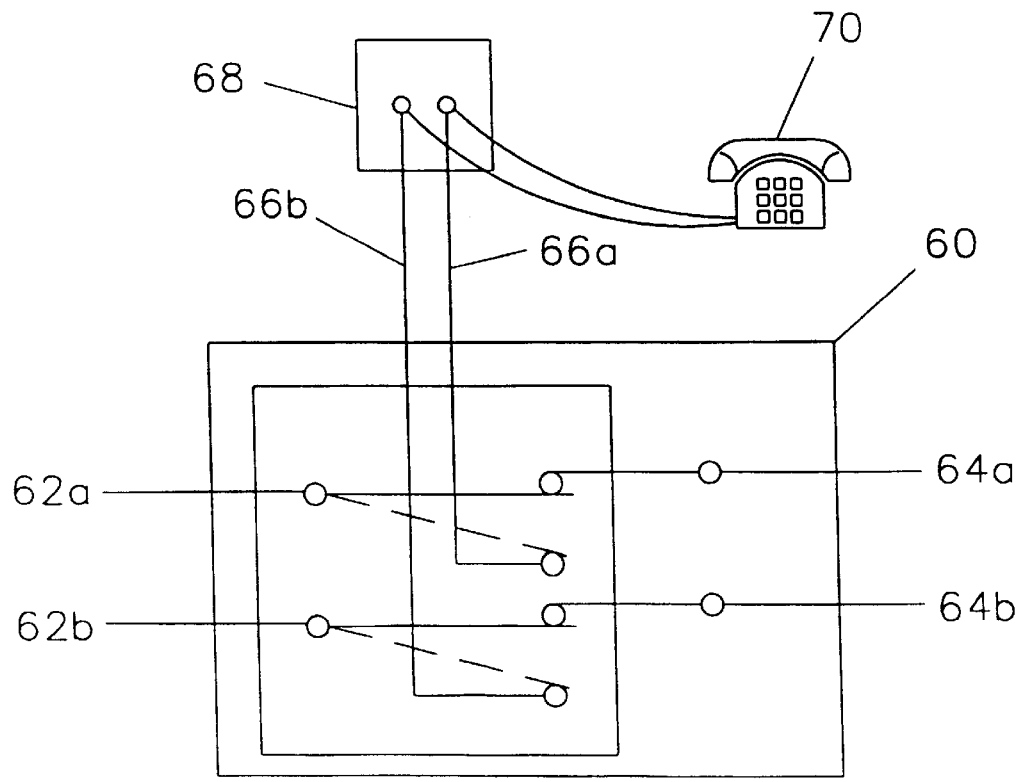
FIG. 7 is a schematic diagram of a switchable electrical socket for use in a subscriber bridge module.

FIG. 7 shows a plug-actuated switchable RJ-11 type socket 60 for use in customer bridge module 44 shown in FIG. 2. Socket 60 is adapted to be connected to a test phone 70. Under normal operation (with no plug in the switchable socket) the telco wires 62a, 62b are connected to the customer wires 64a, 64b. When a plug is inserted in the socket, the telco wires are disconnected from the customer wires and are connected to wires 66a, 66b which are then connected to test phone 70. This arrangement provides a point of demarcation between the telco and customer lines.

Figure 8:
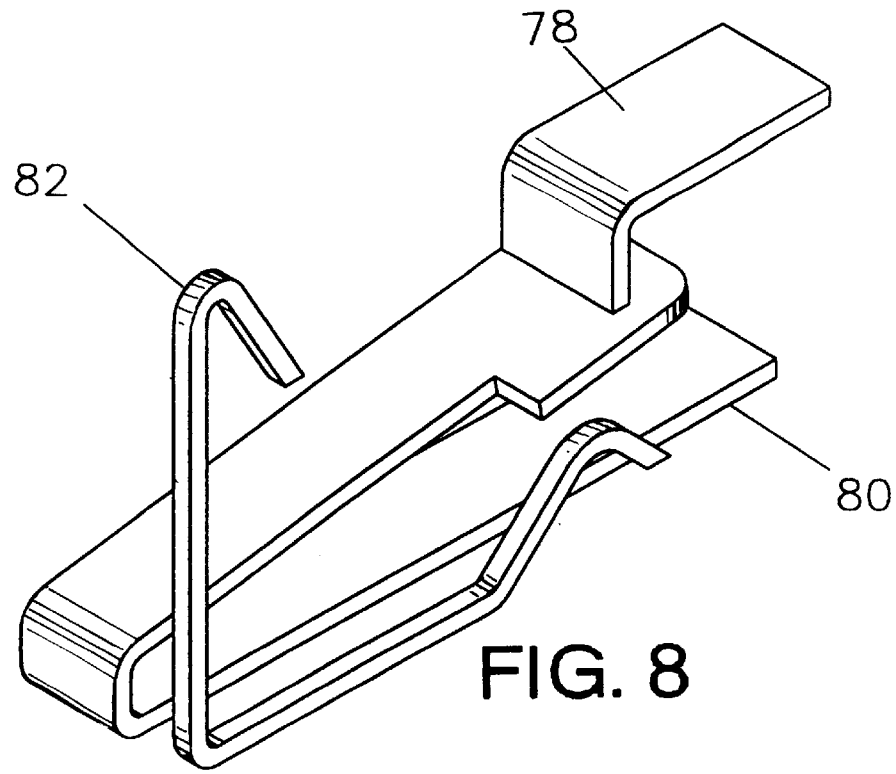
FIG. 8 is a perspective view of one set of electrical contacts for use in the switchable electrical socket shown schematically in FIG. 7, the contacts being shown in their normal position.
Figure 9:
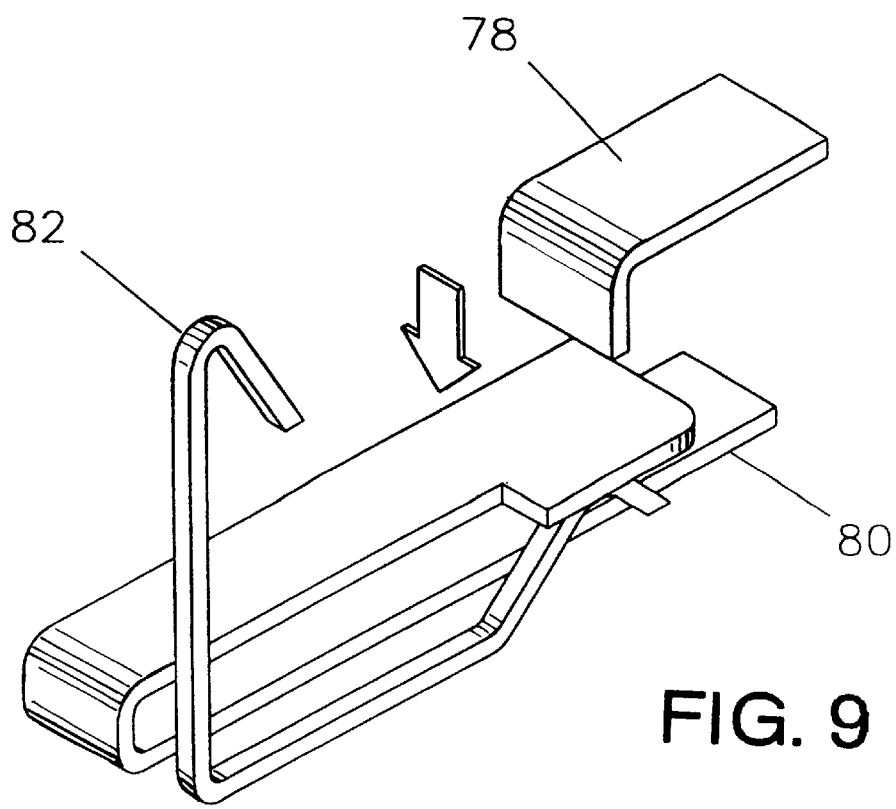
FIG. 9 is a perspective view of the same set of electrical contacts shown in FIG. 8 but with the contacts being shown in their test position.

FIGS. 8 and 9 are reproduced from FIGS. 17 and 18 of U.S. Pat. No. 5,553,136 issued to Meyerhoefer et al on Sep. 3, 1996. As shown in FIGS. 8 and 9, the plug actuated switchable socket 60 has a customer contact 78 for connection to the customer wires, a telco contact 80 for connection to the telco wires and a test contact 82 for connection to a plug. The test contact 82 does not lie in the same plane as the customer and telco contacts 78 and 80. Note that the customer contact 78 and the telco contact 80 are of a heavier gauge material (and therefore have a greater current carrying capacity) than test contact 82. This increases the reliability of the switchable socket as a mechanism for connecting the telco and customer lines.

FIGS. 8 and 9 also show the interaction of the customer, telco and test contacts. As would be understood by a person of ordinary skill in the art, while FIGS. 8 and 9 only show one set of customer, telco and test contacts, switchable socket 60 actually has two sets of such contacts to accommodate the pair of telco and customer wires.

When the plug is not plugged into switchable socket 60, the telco contact 80, and thus the telco wires, are connected to the customer contact 78, and thus the customer wires, and the test contact 82 is out of the circuit. When the plug is inserted in socket 60, the customer contact 78, and thus the customer wires, are disconnected from the telco contact 80, and thus the telco wires, and the telco contact and telco wires are connected to the test contact 82 in socket 60 which mate with contacts in the RJ-11 test plug. See also FIGS. 14–16 of U.S. Pat. No. 5,553,136 which show the mechanical interaction between the test plug and the switchable socket. FIGS. 14–16 are incorporated herein by reference.

While the present invention has been described by reference to various preferred embodiments, it will be understood by persons skilled in the art that many modifications and variations may be made in those preferred embodiments without departing from the spirit and scope of the present invention. Accordingly, it is intended that the invention not be limited to the disclosed preferred embodiments, but that it have the full scope permitted by the following claims.

What is claimed is:

1. Residential protection service center apparatus comprising:

(a) an enclosure;
   (b) an AC power meter pan base mounted in the enclosure and adapted to be connected to first and second AC power lines and to the AC neutral line;
   (c) a first ground conductor mounted in the enclosure, the first ground conductor being connected to the AC power meter pan base and being adapted to be connected to the AC neutral line and to earth ground;
   (d) a second ground conductor mounted in the enclosure, the second ground conductor being connected to the first ground conductor;
   (e) at least one primary overvoltage protection device connected to the second ground conductor and being adapted to be connected to a telephone company line to protect the line from overvoltage conditions;
   (f) a third ground conductor mounted in the enclosure, the third ground conductor being connected to the first ground conductor at the same location as the earth ground is connected to the first ground conductor; and
   (g) at least one coaxial connector connected to the third ground conductor and being adapted to connect at least two coaxial transmission lines.

2. The apparatus of claim 1 further comprising:

(a) a fourth ground conductor mounted in the enclosure, the fourth ground conductor being connected to the first ground conductor; and
   (b) an AC surge suppressor connected to the fourth ground conductor and being adapted to be connected to the AC power lines to suppress voltage surges on the AC power lines.

3. The apparatus of claim 1 wherein the coaxial connector includes a primary coaxial surge arrestor adapted to be connected in series with the coaxial transmission lines to protect the coaxial transmission lines from overvoltage conditions.

4. The apparatus of claim 3 wherein the coaxial surge arrestor comprises:

(a) a hollow conductive housing;
   (b) insulating ends adapted to seal the housing;
   (c) an inert gas sealed in the housing;
   (d) a conductor extending through the housing, the conductor having a longitudinal axis oriented in a direction parallel to the direction of signal transmission; and
   (e) the diameter of the conductor being varied along at least a portion of the length of the conductor within the housing for matching the impedance of the surge arrestor to that of the coaxial transmission lines.

5. The apparatus of claims 1, 2 or 3 further comprising at least one customer bridge module mounted in the enclosure for interconnecting telephone company and customer lines.

6. The apparatus of claim 5 wherein the customer bridge module comprises a socket having an electrical switch, the switch having two sets of first, second and third contacts, the first contacts of both sets for being connected to the telephone company line, the second contacts of both sets for being connected to the customer line, the first and second contacts of each set being normally connected in the absence of a plug in the socket, thereby connecting the telephone company line and the customer line, the first contacts of both sets being disconnected from the second contacts of both sets and being connected to the third contacts of both sets when a plug is inserted in the socket, thereby disconnecting the telephone company line from the customer line and connecting the telephone company line to the third contacts of both sets which in turn connect with contacts in the plug and provide a demarcation point between the telephone company line and the customer line.

7. The apparatus of claim 6 wherein the current carrying capacity of the first and second contacts of both sets is greater than the current carrying capacity of the third contacts of both sets.

8. The apparatus of claim 1 wherein the coaxial connector includes a coaxial splitter for splitting one incoming coaxial transmission line into a plurality of outgoing coaxial transmission lines.

9. The apparatus of claim 8 wherein the coaxial splitter includes an amplifier connected between the incoming coaxial transmission line and the outgoing coaxial transmission lines.

10. The apparatus of claim 1 further comprising an electrical switch mounted in the enclosure and adapted to be connected in series between the AC power meter pan base and the customer's AC power distribution circuitry.

11. The apparatus of claim 1 wherein the enclosure has at least two access covers, one cover permitting access by a utility and one cover permitting access by a customer.

12. Residential protection service center apparatus comprising:
(a) an enclosure;
(b) an AC power meter pan base mounted in the enclosure and adapted to be connected to first and second AC power lines and to the AC neutral line;
(c) a first ground conductor mounted in the enclosure, the first ground conductor being connected to the AC power meter pan base and being adapted to be connected to the AC neutral line and to earth ground;
(d) a second ground conductor mounted in the enclosure, the second ground conductor being connected to the first ground conductor;
(e) at least one primary overvoltage protection device connected to the second ground conductor and being adapted to be connected to a telephone company line to protect the line from overvoltage conditions; and
(f) at least one coaxial connector connected to the second ground conductor and being adapted to connect at least two coaxial transmission lines.

13. The apparatus of claim 12 further comprising:
(a) a third ground conductor mounted in the enclosure, the third ground conductor being connected to the first ground conductor; and
(b) an AC surge suppressor connected to the third ground conductor and being adapted to be connected to the AC power lines to suppress voltage surges on the AC power lines.

14. The apparatus of claim 12 wherein the coaxial connector includes a primary coaxial surge arrestor adapted to be connected in series with the coaxial transmission lines to protect the coaxial transmission lines from overvoltage conditions.

15. The apparatus of claim 14 wherein the coaxial surge arrestor comprises:
(a) a hollow conductive housing;
(b) insulating ends adapted to seal the housing;
(c) an inert gas sealed in the housing;
(d) a conductor extending through the housing, the conductor having a longitudinal axis oriented in a direction parallel to the direction of signal transmission; and
(e) the diameter of the conductor being varied along at least a portion of the length of the conductor within the housing for matching the impedance of the surge arrestor to that of the coaxial transmission lines.

16. The apparatus of claims 12, 13 or 14 further comprising at least one customer bridge module mounted in the enclosure for interconnecting telephone company and customer lines.

17. The apparatus of claim 16 wherein the customer bridge module comprises a socket having an electrical switch, the switch having two sets of first, second and third contacts, the first contacts of both sets for being connected to the telephone company line, the second contacts of both sets for being connected to the customer line, the first and second contacts of each set being normally connected in the absence of a plug in the socket, thereby connecting the telephone company line and the customer line, the first contacts of both sets being disconnected from the second contacts of both sets and being connected to the third contacts of both sets when a plug is inserted in the socket, thereby disconnecting the telephone company line from the customer line and connecting the telephone company line to the third contacts of both sets which in turn connect with contacts in the plug and provide a demarcation point between the telephone company line and the customer line.

18. The apparatus of claim 17 wherein the current carrying capacity of the first and second contacts of both sets is greater than the current carrying capacity of the third contacts of both sets.

19. The apparatus of claim 12 wherein the coaxial connector includes a coaxial splitter for splitting one incoming coaxial transmission line into a plurality of outgoing coaxial transmission lines.

20. The apparatus of claim 19 wherein the coaxial splitter includes an amplifier connected between the incoming coaxial transmission line and the outgoing coaxial transmission lines.

21. The apparatus of claim 12 further comprising an electrical switch mounted in the enclosure and adapted to be connected in series between the AC power meter pan base and the customer's AC power distribution circuitry.

22. The apparatus of claim 12 wherein the enclosure has at least two access covers, one cover permitting access by a utility and one cover permitting access by a customer.

23. Residential protection service center apparatus comprising:
(a) an enclosure;
(b) an AC power meter pan based mounted in the enclosure and adapted to be connected to first and second AC power lines and to the AC neutral line;
(c) a first ground conductor mounted in the enclosure, the first ground conductor being connected to the AC power meter pan base and being adapted to be connected to the AC neutral line and to earth ground;
(d) a second ground conductor mounted in the enclosure, the second ground conductor being connected to the first ground conductor;
(e) at least one primary overvoltage protection device connected to the second ground conductor and being adapted to be connected to a telephone company line to protect the line from overvoltage conditions;
(f) a third ground conductor mounted in the enclosure, the third ground conductor being connected to the first ground conductor at a location which is intermediate the connection between the first ground conductor and the AC power meter pan base and the connection between the first ground conductor and earth ground; and
(g) at least one coaxial connector connected to the third ground conductor and being adapted to connect at least two coaxial transmission lines.

24. The apparatus of claim 23 further comprising:
(a) a fourth ground conductor mounted in the enclosure, the fourth ground conductor being connected to the first ground conductor; and
(b) an AC surge suppressor connected to the fourth ground conductor and being adapted to be connected to the AC power lines to suppress voltage surges on the AC power lines.

25. The apparatus of claim 23 wherein the coaxial connector includes a primary coaxial surge arrestor adapted to be connected in series with the coaxial transmission lines to protect the coaxial transmission lines from overvoltage conditions.

26. The apparatus of claim 25 wherein the coaxial surge arrestor comprises:

(a) a hollow conductive housing;

(b) insulating ends adapted to seal the housing;

(c) an inert gas sealed in the housing;

(d) a conductor extending through the housing, the conductor having a longitudinal axis oriented in a direction parallel to the direction of signal transmission; and (e) the diameter of the conductor being varied along at least a portion of the length of the conductor within the housing for matching the impedance of the surge arrestor to that of the coaxial transmission lines.

27. The apparatus of claims 23, 24 or 25 further comprising at least one customer bridge module mounted in the enclosure for interconnecting telephone company and customer lines.

28. The apparatus of claim 27 wherein the customer bridge module comprises a socket having an electrical switch, the switch having two sets of first, second and third contacts, the first contacts of both sets for being connected to the telephone company line, the second contacts of both sets for being connected to the customer line, the first and second contacts of each set being normally connected in the absence of a plug in the socket, thereby connecting the telephone company line and the customer line, the first contacts of both sets being disconnected from the second contacts of both sets and being connected to the third contacts of both sets when a plug is inserted in the socket, thereby disconnecting the telephone company line from the customer line and connecting the telephone company line to the third contacts of both sets which in turn connect with contacts in the plug and provide a demarcation point between the telephone company line and the customer line.

29. The apparatus of claim 28 wherein the current carrying capacity of the first and second contacts of both sets is greater than the current carrying capacity of the third contacts of both sets.

30. The apparatus of claim 23 wherein the coaxial connector includes a coaxial splitter for splitting one incoming coaxial transmission line into a plurality of outgoing coaxial transmission lines.

31. The apparatus of claim 30 wherein the coaxial splitter includes an amplifier connected between the incoming coaxial transmission line and the outgoing coaxial transmission lines.

32. The apparatus of claim 23 further comprising an electrical switch mounted in the enclosure and adapted to be connected in series between the AC power meter pan base and the customer's AC power distribution circuitry.

33. The apparatus of claim 23 wherein the enclosure has at least two access covers, one cover permitting access by a utility and one cover permitting access by a customer.

* * * * *